United States Patent Office 3,256,062
Patented June 14, 1966

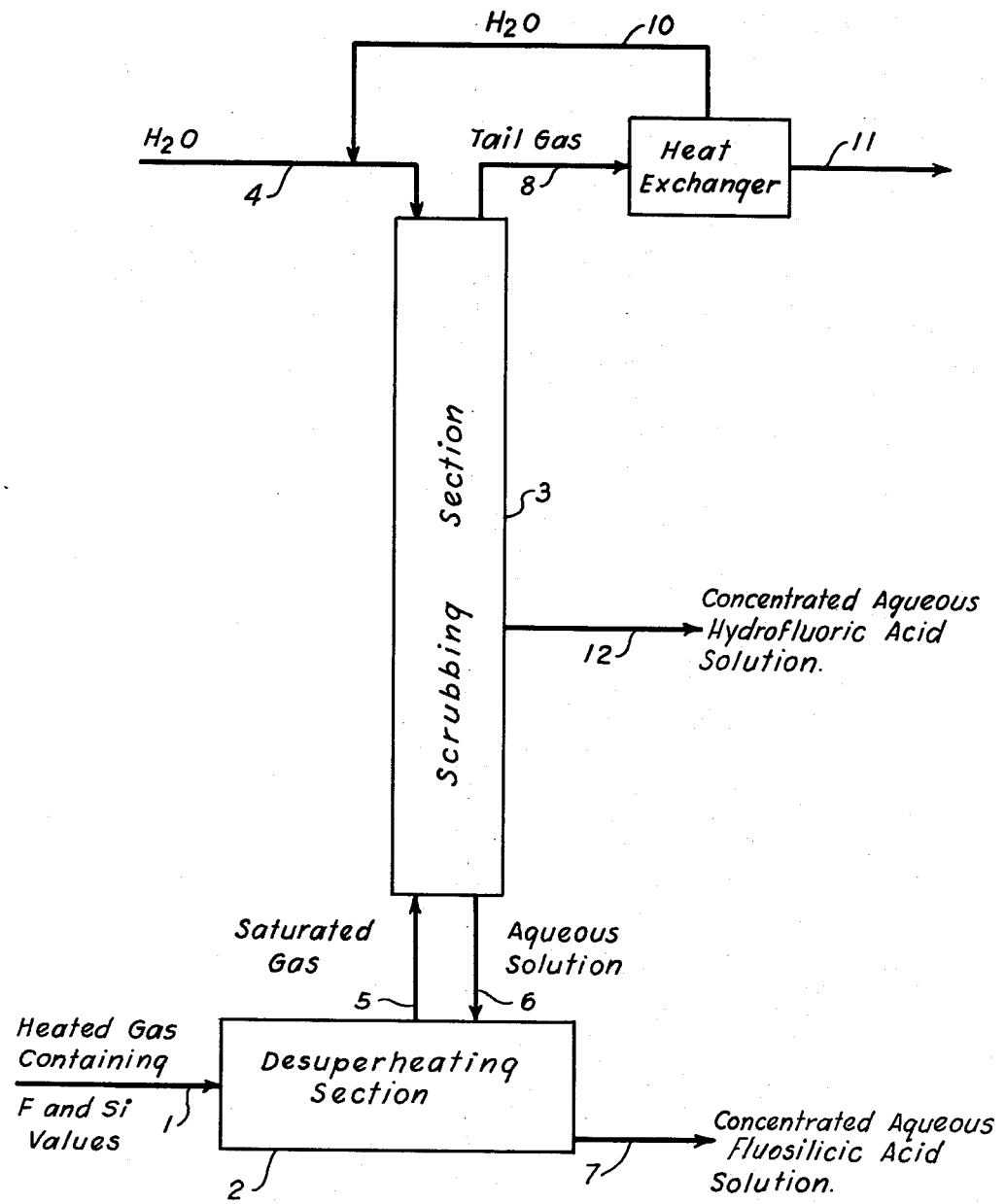

3,256,062
PROCESS FOR SEPARATING AND CONCENTRATING FLUORINE VALUES
Joseph J. Wylegala, Grand Island, N.Y., assignor to Hooker Chemical Corporation, Niagara Falls, N.Y., a corporation of New York
Filed June 14, 1962, Ser. No. 202,541
11 Claims. (Cl. 23—153)

This invention relates to a process for making fluorine-containing solutions, and, more particularly, relates to such a process wherein the fluorine-containing solution is obtained by the treatment of gases containing fluorine and silicon values.

In many industrial operations directed to the treatment or production of fluorine-containing compounds, the off gases from these processes contain appreciable quantities of fluorine values. In view of the toxicity of these fluorine values, such gases must be treated so as to render innocuous the toxic contaminants contained therein, before the gases can be released to the atmosphere. Inasmuch as the treatment of these gases so as to make them suitable for release to the atmosphere is, of necessity, an expensive process, it is very desirable that the fluorine values contained therein be recovered during the treating steps. In this manner, where these values are recovered in a usable or salable form, a significant reduction in the overall expense of disposing of the gas is obtained.

This problem of disposal of waste gases containing fluorine values is particularly serious with regard to processes involving the acidulation and/or calcination of phosphatic minerals. Inasmuch as such phosphatic minerals generally contain appreciable amounts of fluorine values, principally in the form of calcium fluorides, the treatment of such materials, as by calcination and/or acidulation, results in the release of these fluorine values, in gaseous form. Before such gases can be discharged to the atmosphere without creating a health hazard, these fluorine values must be removed, and, preferably recovered in a salable or usable form.

Heretofore, many processes have been proposed for the recovery of the fluorine values from such waste gas streams. All of these processes, however, have been either difficult or expensive to operate, or have resulted in obtaining the fluorine in a form which is not readily usable or salable. For example, in many of the prior art processes, the fluorine values have been recovered in the form of fluosilicic acid. Inasmuch as the market price for this material is generally low, such processes have not been economically attractive. Accordingly, the recovery of the fluorine values, as, for example, hydrogen fluoride, which commands a higher price, is more desirable.

Moreover, such waste gases also generally contain appreciable amounts of silicon values. Such values are frequently found combined with the fluorine values as $SiF_4$. Accordingly, the separation of such silicon values from the HF must be effected in order to obtain the HF in a salable or usable form. For the most part, these prior art processes have not been completely successful in effecting this separation.

It is, therefore, an object of the present invention to provide a process for treating gases containing fluorine and silicon values so as to separate these values and recover the fluorine values in the form of a hydrogen fluoride solution.

Another object of the present invention is to provide an improved process for the type described wherein the fluorine values in waste gases such as those obtained from the acidulation and/or calcination of phosphatic materials, are recovered efficiently and economically as a readily salable or usable hydrogen fluoride solution.

These and other objects will become apparent to those skilled in the art from the description of the invention which follows.

The drawing which is attached hereto and forms a part hereof is a schematic representation of a preferred process of the invention.

The process of the present invention envisions treating a gas which contains fluorine values and silicon values, a major amount of said fluorine values being present as hydrogen fluoride, so that the molar ratio of HF to $SiF_4$ in the gas is at least 5:1, and which gas is further substantially free of any solid impurities. The gas, at an elevated temperature of at least 150° C., is contacted with an aqueous scrubbing solution, whereby substantially all of the fluorine and silicon values are extracted from the gas. The resulting aqueous solution containing the fluorine and silicon values is then vaporized and a fractionation utilizing the sensible heat of the gas takes place so that two separate solutions are formed, one containing substantially all of the silicon values, as fluosilicic acid, and the other containing substantially only fluorine values, as hydrogen fluoride, and being substantially free from silicon and other impurities.

By operating in accordance with the above procedure, a concentrated solution of hydrofluoric acid is obtained. The fractionation of the scrubbing liquor which is effected by use of the sensible heat of gas being treated makes it possible to obtain a solution having a hydrogen fluoride concentration which is much higher than that which can exist in direct equilibrium with the gas being treated. The same is also true for the fluosilicic acid solution which is obtained. Thus, in the present process, a separation of the silicon values from the hydrogen fluoride is obtained and substantially all of the silicon and fluorine values are extracted from the gas. The thus-produced highly concentrated aqueous solution of hydrofluoric acid may be used or sold as such, or, if desired, it may be subjected to additional processing to obtain a substantially anhydrous hydrogen fluoride gas. Exemplary of such additional processing which may be used are the methods which have been set forth in two copending applications, SN 197,078, and SN 197,522, filed May 23 and 24, 1962, respectively.

Considering now the present process in more detail, it is to be noted that, although the gas containing both fluorine and silicon values, may come from any source, the preferred gases for treatment in accordance with the present invention are waste gases resulting from the acidulation and/or calcination of phosphatic materials. Such gases are, however, merely exemplary of those which may be treated by the present process, and, while specific reference hereinafter will be made to the treatment of such gases, this is not to be taken as a limitation on the present invention. These waste gases from the acidulation and/or calcination of phosphatic material contain, generally in minor amounts, fluorine values, silicon values, and also suspended solid impurities.

As has been noted hereinabove, before the gas is treated in accordance with the method of the present invention, substantially all of the suspended solid matter should be removed from the gas and the major amount of fluorine values in the gas should be in the form of hydrogen fluoride so that there is a molar ratio of HF to $SiF_4$ of at least 5:1. Preferably, this molar ratio of HF to $SiF_4$ in the gas will be considerably higher than 5:1, ratios of 25:1, 50:1 and higher being more specifically preferred.

The removal of the suspended solid impurities and the obtaining of the desired HF to $SiF_4$ molar ratio may be accomplished in any suitable manner. For example, these results may be achieved by treating the gas in accordance with the process which has been set forth in detail in the above-mentioned copending application, SN 197,078, filed May 23, 1962. Briefly, such a process involves correlating the gas temperature, water concentration, and total fluorine concentration of the gas to obtain the desired high molar ratio of HF to $SiF_4$, and, thereafter, separating substantially all of the suspended solid impurities from the gas, while permitting no appreciable variation in the adjusted temperature, water concentration, and total fluorine concentration, which would result in a reduction of the HF to $SiF_4$ ratio obtained. Once the gas has been treated, either in the above manner or in any other convenient manner, and the HF to $SiF_4$ molar ratio of at least 5:1 is obtained, the gas can be treated in accordance with the method of the present invention.

The gas, having substantially all of its silicon values in the form of silicon tetrafluoride, and having an HF to $SiF_4$ ratio of at least 5:1 is contacted with an aqueous solution, preferably water, whereby substantially all of the hydrogen fluoride in the gas is absorbed in the water. This contact of the gas with the aqueous solution is, preferably, carried out in an absorbing or scrubbing tower so that the gas, at an elevated temperature of at least about 150° C., entering the bottom of the tower is contacted with an aqueous solution which contains the absorbed hydrogen fluoride. In addition to the hydrogen fluoride in the gas stream, any silicon tetrafluoride present will also be absorbed by the aqueous scrubbing liquor. By maintaining the incoming gas at an elevated temperature, however, the sensible heat of the gas is utilized to effect a refluxing or fractionation in the upper portion of the scrubbing tower, so that a relatively concentrated solution of fluosilicic acid, containing some hydrogen fluoride, can be removed from the bottom of the scrubbing tower. The major portion of the absorbed hydrogen fluoride, because of this refluxing or fractionation operation, is then removed from an intermediate portion of the tower as a relatively concentrated solution. Depending upon the water content of the gas which is scrubbed, this aqueous solution of hydrogen fluoride can have a concentration up to about 38%, which is the concentration of the azeotropic mixture. Inasmuch as the water concentration of the gas being treated is, generally, fairly high, e.g., 25% to 35%, the hydrogen fluoride solution produced will generally have a concentration of about 25% to 35%. This concentration is considerably higher than that which can normally exist in direct equilibrium with the entering gas. As has been indicated hereinabove, after the recovery of this concentrated aqueous solution of hydrofluoric acid, it may be subjected to additional processing to obtain a substantially anhydrous hydrogen fluoride.

The remainder of the gas, after passing in contact with the aqueous scrubbing medium, is found to be substantially free of hydrogen fluoride, and silicon tetrafluoride. This gas may then be discharged to the atmosphere, or, where it contains appreciable quantities of other valuable constituents, such as $SO_2$, it may be sent to additional processing to recover these materials. Where the gas treated in accordance with the present invention results from the acidulation and/or calcination of phosphatic materials, the fluosilicic acid solution containing some hydrogen fluoride, which is recovered from the bottom of the scrubber or absorber, may be recycled to the calcination and/or acidulation portion of the process.

With regard to the temperature of the gas being treated in the present process, it is to be appreciated that the minimum temperature which can be utilized will depend on several factors. Where the gas contains considerable quantities of water, higher gas temperatures will have to be maintained in order to effect sufficient fractionation of the absorbing liquor, utilizing the sensible heat of the gas, to obtain the desired highly concentrated aqueous solutions of hydrofluoric acid. Similarly, the type of absorbing apparatus used will affect the minimum temperature required in the gas. For example, where a packed column type of absorber is used, a comparatively large volume of absorbing liquor must be passed through the column in order to provide sufficient contact between the liquid and vapor to absorb the hydrogen fluoride. This, of course, will require a higher gas temperature in order to vaporize the larger volume of liquid. It has been found that the gas being treated in accordance with the present method should be at a temperature which is not substantially below about 150° C., and, preferably, not substantially below about 300 to 350° C. With this preferred minimum gas temperature of about 350° C., water concentrations in the gas of as high as 25% to 35% can be tolerated with no adverse effect on either the efficiency of the hydrogen fluoride removal from the gas, or in the concentration of the resulting aqueous solution of hydrofluoric acid. It will, of course, be appreciated that gas temperatures considerably in excess of the minimums set forth hereinabove are preferably used. The only limitation on the maximum temperature of the gas is that imposed by the materials of which the scrubbing apparatus are constructed. Excellent results have been obtained in the operation of the present process when using gas temperatures within the range of about 450 to 500° C., although even higher temperatures can be used if desired.

The scrubbing system which is used in the present process is constructed so as to provide a multiplicity of transfer units or plates. The gas containing the silicon and fluorine values is preferably introduced into the bottom of the scrubbing apparatus and is countercurrently contacted with the water scrubbing liquor, which is introduced into the top of the apparatus. The amount of water which is passed through the scrubbing apparatus must be sufficient both to cool the gas by evaporation, as well as to provide for the solution of the fluorine compound. The actual amount of water used in each instance will, of course, depend on the gas composition, gas temperature and type of scrubbing apparatus used. In most instances, however, the amount of water supplied for the evaporative cooling will be many times that contained in the solution of fluosilicic acid and hydrofluoric acid which are removed from the scrubbing apparatus.

As the required amount of water is run through the scrubbing system, countercurrent to the gas, because of the multiplicity of transfer units in the scrubber, concentration gradients in the aqueous solutions of fluorine compounds formed will occur along the absorption apparatus. In this manner, essentially all of the silicon is drawn out of the system from the area of initial contact with the gas stream, as a solution of water, fluosilicic acid, and hydrofluoric acid. Additionally, most of the hydrogen fluoride is drawn out of an intermediate section of the scrubbing apparatus as a solution of hydrofluoric acid and water, containing only very small amounts of dissolved silicon. In this manner, not only is there a separation of fluosilicic acid and substantially all of the hydrofluoric acid, but, additionally, the fractionation action in the scrubber, which is effected by the sensible heat of the incoming gas, gives these fluorine-containing solutions a far higher concentration than would normally exist in direct equilibrium with the entering gas.

It is believed to be apparent that both the separation of the fluosilicic acid from the hydrofluoric acid, and the production of more highly concentrated solutions, are beneficial results of the present process. For example, a high concentration of hydrofluoric acid in water is less expensive to process, as, for example, by dehydration, for sale as anhydrous hydrogen fluoride than is a less concentrated solution. Similarly, a strong solution of fluosilicic acid is preferred over a dilute solution, either for processing into fluosilicates or fluorides, or, even when used for a recycle, back into a phosphate rock calcination or acidulation process, as has been suggested hereinabove. Additionally, once the gas stream has passed through the scrubbing apparatus, substantially all of the fluorine values, as hydrogen fluoride, as well as the silicon values, as fluosilicic acid, have been removed.

With regard to the scrubbing liquor which is used in the present process, as has been noted hereinabove, the preferred scrubbing liquor for use in the present process is water. This scrubbing water may come from any convenient source and be introduced into the scrubbing apparatus, preferably, opposite to the introduction of the gas, in any suitable manner. Where the gas, after being treated, contains large quantities of water, as, for example, 25% to 35% by volume water, it has been found to be advantageous in the present process if this water is, at least in part, condensed out of the gas stream and used as the source of water for the scrubbing system. Such a step has been found to be particularly desirable when the gas is subjected to additional processing after leaving the scrubbing apparatus, to recover additional valuable constituents, as, for example, $SO_2$. Moreover, this step is further advantageous in that it provides an additional transfer unit or plate for the scrubbing operation, thus, giving additional scrubbing action. The condensation of this water from the gas stream may be accomplished by passing the gas, after it leaves the scrubber, through any heat exchanger apparatus. This apparatus may be a direct-contact heat exchanger, such as a spray tower, or any of the conventional indirect-contact heat exchangers available. The water which is thus condensed from the gas is then reintroduced into the top of the scrubbing apparatus. Where necessary, of course, additional quantities of water may be added to that condensed from the gas stream to provide a sufficient volume of water as is required for the scrubbing operation.

As has been indicated hereinabove, the concentrated aqueous solution of hydrofluoric acid which is recovered by the process of the present invention may be sold as such or used in other processes, as, for example, in liquid phase fluorinations. Alternatively, the hydrofluoric acid solution may be further processed to recover substantially anhydrous hydrogen fluoride, as, for example, by reacting it with an alkali metal fluoride as in one of the processes described in the two copending applications set forth hereinabove.

Considering now the drawing, the absorption tower used in the present process is comprised of a desuperheating section 2, and a scrubbing section 3. As is indicated schematically in the drawing, these two sections of the absorption tower are shown as being separate. It is to be understood, however, that such an arrangement is not essential to the present process, and the two sections may be combined into a single tower. The scrubbing section may be of any design which will furnish a sufficient number of transfer units or plates to obtain the desired separation and concentration of the solutions of hydrogen fluoride and silicon tetrafluoride. Similarly, the desuperheating portion of the absorption tower may be of diverse design, as, for example, a spray chamber, an eductor type scrubber, or a short section of packed tower, irrigated with a large recirculating liquid flow. Any design, either as a separate unit, or as a part of the scrubbing section, which will serve to saturate the incoming gas with water vapor, and evaporate substantially all of the liquid coming from the scrubbing section of the tower, has been found to be satisfactory.

As is shown in the drawing, the heated gas containing the fluorine and silicon values, is introduced into the desuperheating section 2 at the bottom of the tower through the conduit 1. The scrubbing liquor, e.g., water, is introduced into the scrubbing section 3 at the top of the tower through conduit 4. The scrubbing water passes through the scrubbing section 3 countercurrent to the flow of gas which is being scrubbed. Most of the scrubbing liquor flows from the bottom of the scrubbing section 3 through the conduit 6, into the desuperheating section 2 of the tower, as an aqueous solution. Within the desuperheating section of the tower, the gas introduced through conduit 1, at a high temperature, e.g., 450° C. to 500° C. is saturated by evaporation of substantially all of the scrubber liquid. The saturated gas passes upward through conduit 5 from the desuperheating section into the scrubbing section of the tower. In this manner, the sensible heat of the incoming gas is utilized to effect a fractionation of the liquid product, so that a relatively concentrated solution of hydrofluoric acid is withdrawn through conduit 12 from an intermediate portion of the scrubbing section of the tower, while a relatively concentrated solution of fluosilicic acid is withdrawn through conduit 7 from the bottom of the desuperheating section of the tower.

The gases which pass through the scrubbing section 3, and into the conduit 8, are found to be substantially free of hydrogen fluoride. From the conduit 8, these gases are passed into a heat exchanger 9, which heat exchanger may be either a direct or indirect contact type. Within the heat exchanger 9, a substantial portion of the water in the gas is condensed, recovered and returned through conduit 10 to conduit 4, to be used as part or all of the scrubbing liquor for the process. It is, of course, obvious that where the amount of water thus condensed from the tail gas is insufficient for the scrubbing operation, additional water can be added from any other suitable source.

In the actual operation of the present process, a gas having the following composition is introduced into the desuperheating section of the absorption tower:

| | Moles |
|---|---|
| Inert material ($N_2$, $O_2$, $CO_2$) | 73.00 |
| Steam | 23.00 |
| Sulphur dioxide | 3.00 |
| Hydrogen fluoride | 0.74 |
| Silicon tetrafluoride | 0.05 |

The temperature of the gas as it is introduced into the desuperheating section of the tower is about 480° C. Into the top of the scrubbing section of the absorption tower, water is introduced at the rate of about 36.4 moles of water per 100 moles of entering gas. The water flows downwardly through the tower countercurrent to the flow of the gas. This quantity of water is found to be sufficient to effect a reduction in the temperature of the gas from about 480° C. to about 80° C. Additionally, absorption of the fluorine and silica values in the gas is obtained, with a separation in concentration of these values by means of fractionation caused by the sensible heat of the incoming gas. From the desuperheating section in the bottom of the absorption tower, there is withdrawn a fluosilicic acid solution having the following composition:

| | Moles |
|---|---|
| Fluosilicic acid | 0.05 |
| Hydrofluoric acid | 0.155 |
| Water | 0.860 |
| Sulphur dioxide | Trace |

From an intermediate portion of the scrubbing section of the tower, an aqueous solution of hydrofluoric acid is withdrawn having the following composition:

| | Moles |
|---|---|
| Hydrofluoric acid | 0.475 |
| Water | 1.540 |
| Sulphur dioxide | Trace |

This solution has a hydrogen fluoride concentration of about 25% by weight.

The gases leaving the scrubbing section of the absorption tower are found to have the following composition:

| | Moles |
|---|---|
| Inert material ($N_2$, $O_2$, $CO_2$) | 73.00 |
| Steam | 57.00 |
| Sulphur dioxide | 3.00 |
| Hydrogen fluoride | 0.01 |

This gas stream, after leaving the absorption tower, is passed through a heat exchanger wherein the temperature of the gas is reduced to about 67° C. This reduction in temperature of the gas is sufficient to condense enough water out of the gas to supply the entire requirements of scrubbing water of 36.4 moles of water per 100 moles of gas entering the scrubbing apparatus. The thus-condensed water is reintroduced into the top of the scrubbing section of the absorber wherein it flows in countercurrent contact to the stream of incoming gas.

From this, it is seen that by the process of the present invention, a highly concentrated aqueous solution of hydrofluoric acid can be obtained from a gas containing both fluorine and silicon values. An effective and efficient separation of these values is obtained by the present process, with substantially all of the values being removed from the gas. Moreover, the present process is found to be efficient in operation in that the heat content of the gas being treated is utilized to effect this separation of the silicon and fluorine values, as well as to effect the production of the highly concentrated aqueous solution of hydrofluoric acid.

While there have been described various embodiments of the invention, the methods described are not intended to be understood as limiting the scope of the invention, as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A process for obtaining a concentrated aqueous solution of hydrofluoric acid from a gas stream containing silicon values and fluorine values, which gas stream is substantially free from any solid impurities and which has the major amount of the fluorine values present as hydrogen fluoride, so that the molar ratio of HF to $SiF_4$ in the gas is at least 5:1, which process comprises maintaining said gas at an elevated temperature of at least 150° C., thereafter contacting the gas with an aqueous solution, extracting substantially all of the silicon and fluorine values from the gas into the aqueous solution, vaporizing and fractionating the thus-formed solution by utilizing the sensible heat of the gas being treated, and forming two separate aqueous solutions, one containing substantially all of the silicon values, and the other containing substantially only fluorine values as HF, and being substantially free from silicon values and other impurities.

2. The process as claimed in claim 1, wherein the molar ratio of HF to $SiF_4$ is at least 25:1, and the temperature of the gas is at least 300° C.

3. The method as claimed in claim 1, wherein the aqueous solution of hydrogen fluoride produced has a hydrogen fluoride content of at least 25% by weight.

4. The process as claimed in claim 2, wherein the aqueous solution of hydrogen fluoride produced has a hydrogen fluoride concentration of at least 25% by weight.

5. A process for producing a concentrated aqueous solution of hydrofluoric acid from a gas stream containing silicon and fluorine values, which gas stream is substantially free from any solid impurities, and which has a major amount of the fluorine values present as hydrogen fluoride, so that the molar ratio of HF to $SiF_4$ in the gas is at least 5:1, which process comprises maintaining said gas at an elevated temperature of at least 150° C,. introducing said gas into an absorption zone having a multiplicity of transfer plates, said absorption zone being comprised of a desuperheating section and a scrubbing section, contacting the gas within the absorption zone with an aqueous solution, the gas being introduced into the desuperheating section at the bottom of the zone, and the aqueous solution being introduced into the scrubbing section at the top of the zone, extracting substantially all of the silicon and fluorine values from the gas with the aqueous solution in the scrubbing section of the zone, passing the thus-obtained aqueous solution into the desuperheating section of the zone vaporizing the aqueous solution in the desuperheating portion of the zone by utilizing the sensible heat of the incoming gas introduced into the desuperheating section, returning the thus vaporized solution to the scrubbing section and therein contacting the liquid and vapor phases so as to effect a fractionation to form two separate aqueous solutions, one containing substantially all of the silicon values, and the other containing substantially only fluorine values, as hydrogen fluoride, and being substantially free from silicon values and other impurities.

6. The process as claimed in claim 5, wherein the scrubbing section and the desuperheating section of the absorption zone are separate units.

7. The process as claimed in claim 5, wherein the aqueous solution introduced into the scrubbing section at the top of the absorption zone is water.

8. A process for obtaining a concentrated aqueous solution of hydrofluoric acid from a gas stream containing silicon values and fluorine values, which gas is substantially free of any solid impurities, and which has a major amount of the fluorine values present as hydrogen fluoride, so that the molar ratio of HF to $SiF_4$ in the gas is at least 25:1, which process comprises maintaining the gas at an elevated temperature of at least 300° C., introducing the gas into an absorption zone having a multiplicity of transfer plates, said absorption zone being comprised of a desuperheating section and a scrubbing section, the gas being introduced into the desuperheating section at the bottom of the zone, introducing water into the scrubbing section at the top of the adsorption zone, contacting the gas within the zone with the water by passing the water countercurrent to the flow of gas through the zone, extracting substantially all of the silicon and fluorine values from the gas with the water in the scrubbing section of the zone, passing the thus-formed aqueous solution from the scrubbing section into the desuperheating section of the zone, vaporizing the aqueous solution in the desuperheating section by utilizing the sensible heat of the gas introduced into the desuperheating section, passing the gaseous mixture thus formed back into the scrubbing section of the zone, and therein contacting the gaseous mixture with the aqueous scrubber solution and effecting a fractionation so as to form two separate aqueous solutions, one containing substantially all of the silicon values, in the form of fluosilicic acid, and the second containing substantially only fluorine values, as hydrogen fluoride, the hydrogen fluoride concentration of said solution being at least 25% by weight, and said solution being substantially free from silicon values and other impurities.

9. The process as claimed in claim 8, wherein the solution of fluosilicic acid is removed from the desuperheating section at the bottom of the absorption zone and the solution of hydrofluoric acid is removed from an intermediate point in the scrubbing section of the absorption zone.

10. The process as claimed in claim 8, wherein the water introduced in the scrubbing section at the top of the absorption zone is obtained by condensing the water from the gas stream after it is passed through the absorption zone.

11. The method as claimed in claim 10, wherein the water is condensed from the gas stream by passing it through a heat exchanger, after it has passed through the absorption zone.

(References on following page)

References Cited by the Examiner

UNITED STATES PATENTS

| | | | |
|---|---|---|---|
| 1,903,408 | 4/1933 | Soll et al. | 23—153 X |
| 2,047,210 | 7/1936 | Lawrence | 23—153 |
| 2,141,773 | 12/1938 | Strathmeyer | 23—153 X |
| 2,456,509 | 12/1948 | Hopkins et al. | 23—153 |
| 2,890,129 | 6/1959 | Kaufmann | 23—153 X |
| 3,004,829 | 10/1961 | Boyle et al. | 23—153 |
| 3,102,787 | 9/1963 | McMillan et al. | 23—153 |

FOREIGN PATENTS

| | | |
|---|---|---|
| 357,438 | 9/1931 | Great Britain. |
| 799,624 | 8/1958 | Great Britain. |

BENJAMIN HENKIN, *Primary Examiner.*

MAURICE A. BRINDISI, *Examiner.*

E. STERN, *Assistant Examiner.*